United States Patent

Akama

Patent Number: 5,432,657
Date of Patent: Jul. 11, 1995

[54] CUE AND REVIEW MECHANISM FOR A TAPE RECORDER

[75] Inventor: Hideaki Akama, Kakuda, Japan

[73] Assignee: Alps Electric Co., Ltd., Tokyo, Japan

[21] Appl. No.: 30,942

[22] Filed: Mar. 12, 1993

[30] Foreign Application Priority Data

Mar. 24, 1992 [JP] Japan ............................ 4-024478 U

[51] Int. Cl.⁶ .................... G11B 15/48; G11B 15/18
[52] U.S. Cl. ................................. 360/74.1; 360/72.1; 360/74.4; 360/73.06
[58] Field of Search .................. 360/74.1, 74.4, 72.1, 360/72.2, 72.3, 69, 73.05, 73.06, 73.07

[56] References Cited

U.S. PATENT DOCUMENTS 4,418,367 11/1983 Nagai et al. ...................... 360/72.1
4,553,180 11/1985 Hasegawa ........................ 360/72.1

FOREIGN PATENT DOCUMENTS 62-46454 2/1987 Japan .
3-268256 2/1991 Japan .

Primary Examiner—Aristotelis Psitos
Assistant Examiner—Varsha A. Kapadia
Attorney, Agent, or Firm—Guy W. Shoup; Patrick T. Bever

[57] ABSTRACT

A tape recorder is disclosed in which an accurate cue & review operation is possible without being influenced by the wound state of a magnetic tape or the fluctuation of the mechanical load.

In the tape recorder a first controller 21, a second controller 22 and a third controller 23 are provided and controls are executed as shown in the following: a cue & review operation is performed in a suspended state of an audio signal suspended by the breaking of a transmission circuit for an audio signal by a muting switch 9, and when a playback operation is to be started, if a recorded signal of the first recording portion R1 (a music other than a subject music) is detected, muting state is maintained and when a no signal zone spreading over a specified range is detected, a muting state is released and an audio signal is output; when a playback operation is to be started, if a no signal zone spreading over a specified range is detected, the muting state is immediately released and an audio signal is output; which makes it possible to execute an accurate cue & review processing.

3 Claims, 8 Drawing Sheets

CUE AND REVIEW MECHANISM FOR A TAPE RECORDER

BACKGROUND OF THE INVENTION

1. Field of the Invention

The present invention relates to tape recorders, for example, to those which perform recording and playback on magnetic tapes, and in particular, to the tape recorders having cue & review mechanisms of recorded musics on magnetic tapes.

2. Description of the Prior Art

At present, the tape recorders using tape cassettes for analog signals are mainly used as acoustic facilities to be loaded on private cars, etc. A tape recorder using a magnetic tape as a recording medium has a merit that it is less influenced by vibration in comparison with a CD (compact disk) player, etc. using digital signals and also it is low in cost. It has a demerit, however, that a cue & review processing of a music cannot be accurately made.

A method for a cue & review operation which is similar to that described in a Japanese Patent laid open under Publication No. 135448/82 is used in general tape recorders. An example of such a cue and review operation will be explained referring to FIG. 10. There are a first recording portion R1 and a second recording portion R2 shown by hatching on a magnetic recording surface of a magnetic tape 1. There is a no signal zone shown by void between the first and the second recording portions, R1 and R2. An arrow mark in the figure shows the movement of a magnetic head to execute a cue & review operation of the second recording portion R2. When a magnetic head starts a cue & review operation from a starting point Ts in the first recording portion R1, the magnetic head makes high speed feeding operation, which is faster than a playback speed, toward the second recording portion R2 in retrieving a first no signal zone having a first specified length L1. When the magnetic head passes the rear end E1 of the first recording portion and detects a no signal zone having a first specified length L1, the high speed feeding is suspended once and the direction is reversed and a feeding operation by the length of the second specified length L2 is performed toward the first recording portion R1. After that, the direction of the high speed feeding is again reversed, and a feeding operation by the length of a third specified length L3 is performed toward the second recording portion R2; then a playback operation is started as shown by an arrow expressed with a broken line.

In the case of a cue & review operation controlled as described in the above, the specified lengths L1, L2 and L3 are varied according to the wound state of a magnetic tape; because of this, it was not possible to realize a constantly accurate cue & review operation. In other words, the first, the second and the third specified lengths, L1, L2 and L3 are set by the operating period of time of the driving system which drives the magnetic tape, but a load to be applied to the driving system is changed by the change of the wound state of a magnetic tape. Moreover, a time lag in braking due to high speed feeding increases the change in feeding quantity, and in the result, in some case, it has occurred that a playback operation has been started in the first recording portion or in the second recording portion. Such instability in cue & review operations can give a user an impression of low quality of a tape recorder, which is an undesirable thing for a supplier.

As described in the above, in the case of a general tape recorder, when a cue & review operation is to be performed, it was difficult to make a magnetic head position accurately in the range of a no signal zone, a space between music numbers. When a magnetic head is not placed between music numbers, there occurs a problem that a playback operation can be started in the preceding music or on the way of the subject music of which the cue & review operation is to be executed.

SUMMARY OF THE INVENTION

The present invention is invented in consideration of the above-mentioned problem and an object of the invention is to offer a tape recorder in which an accurate cue & review operation is possible without being influenced by the load fluctuation on a driving system caused by the wound state of a magnetic tape.

The present invention will offer a tape recorder comprising: a travel driving means which selectively drives a magnetic tape to travel in a normal speed travel mode or in a high speed travel mode, higher than a normal speed, and is capable of switching the travel direction of a magnetic tape from 1 direction to the reverse direction and vice versa; a detection means for detecting a signal recorded on a magnetic tape; an output means for outputting a signal detected by the detection means; a muting means for keeping a signal output from the detection means and to be supplied to the output means in a muting state; an input means for inputting a processing target of a magnetic tape; a signal discrimination means for outputting a discrimination signal when a no signal zone spreading over a specified range on a magnetic tape is discriminated, in receiving a signal detected by the detection means; a control means for controlling the travel driving means and the muting means following the input signals from the input means and the signal discrimination means; a first controller which switches the muting means to an ON state and starts the travel driving means in a 1 direction, high speed travel mode when the control means receives an instruction signal of a cue & review processing of a magnetic tape from the input means; a second controller, after the travel driving means is started by the first controller, for switching the travel driving means to a reverse direction, high speed travel mode and for making it operate for a specified period of time when a discrimination signal is received from the signal discrimination means; and a third controller, after the control by the second controller is finished, for starting the travel driving means in switching it to a 1 direction, normal speed mode, and for controlling the muting means to OFF when a discrimination signal is received from the signal discrimination means.

When the first controller receives an instruction signal for a cue & review processing of a magnetic tape from the inputting means, it controls the muting means to an ON state and starts the travel driving means in a 1 direction, high speed travel mode; when the second controller receives a discrimination signal from the signal discrimination means, after the travel driving means is started by the first controller, it switches the travel driving means to travel in a reverse direction, high speed travel mode and makes it continue to operates for a specified period of time; and the third controller starts the travel driving means in switching it to travel in a 1 direction, normal speed travel mode, after the finishing of control by the second controller, and when it receives a discrimination signal from the signal discrimination means, it controls the muting means to be in an OFF state.

DETAILED DESCRIPTION OF THE PREFERRED EMBODIMENTS

Figure 4:
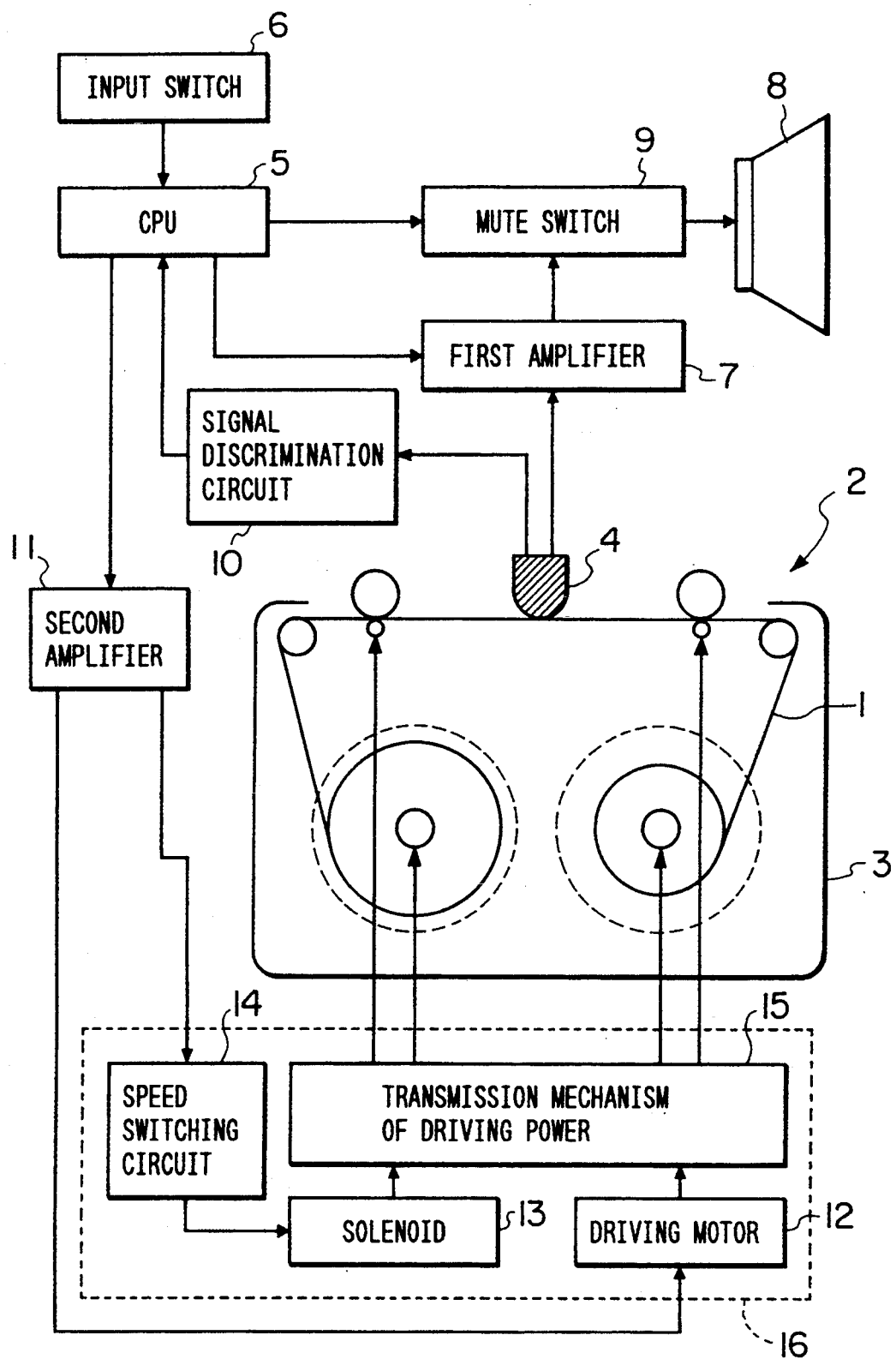
FIG. 4 is an illustrative representation showing the outline of the basic constitution of a tape recorder in an embodiment according to the present invention.

An embodiment according to the present invention will be explained referring to the drawings. A tape recorder 2 according to the present invention is constituted, for example, as shown in FIG. 4. In the main body (not shown in a drawing) of the tape recorder 2, there is formed a mounting portion (not shown in a drawing) for mounting a tape cassette 3, and it is so arranged that a magnetic head 4, a detection means, detects a signal recorded on a magnetic tape 1 mounted in the tape cassette 3, and also makes a signal recorded magnetically on the magnetic tape 1. The tape recorder 2 is controlled by a CPU 5, and the CPU 5 is operated receiving input signals from an input switch 6 as an input portion, a sensor, etc. not shown in a drawing.

A first amplifier 7, as an audio current amplifier, is connected to the CPU 5, and the first amplifier 7 is so constituted as to amplify an input signal from the magnetic head 4 and to supply the output to a speaker 8, an output means. A muting switch 9 as a muting means is connected to the CPU 5. The muting switch 9 is provided between the first amplifier 7 and the speaker 8, and it is subjected to an ON/OFF control of the CPU 5 and performs make and break of a circuit for the transmission of an audio signal. In other words, when the muting switch 9 is ON-controlled by the CPU 5, the output from the speaker 8 is suspended and when it is OFF-controlled an audio signal is output from the speaker 8.

Further, a signal discrimination circuit 10, a signal discrimination means, is connected to the CPU 5. The signal discrimination circuit 10 is so constituted that when a signal from the magnetic head 4 is not input to the signal discrimination circuit 10 for a first specified period of time, it judges that a no signal zone on the magnetic tape 1 is detected, and outputs a discrimination signal to the CPU 5.

Further, a second amplifier 11, a driving current amplification means, is connected to the CPU 5, and a driving motor 12 and a solenoid 13 are driven through the second amplifier 11.

The driving motor 12 is operated in the normal direction or in the reverse direction corresponding to the input from the second amplifier 11, and it drives the magnetic tape 1 through a driving power transmission mechanism 14 composed of a cam gear, a rubber belt and a pulley, etc.,not shown in a drawing. A speed-change circuit 15 is provided between the second amplifier 11 and the solenoid 13, and the speed-change circuit 15 makes gear change of the driving power transmission mechanism 14, not shown in a drawing, by operating the solenoid 13 for the speed change, between a first speed and a second speed. The first speed shows a playback speed of a magnetic tape and the second speed shows a fast feeding speed to be used for a cue or review operation. The second speed is set to be faster than the first speed.

A travel driver 16, a travel driving means, is composed of the driving motor 12, the solenoid 13, the speed change circuit 15 and the driving power transmission mechanism 14.

In other words, the switching between a normal travel mode and a high speed travel mode, and the switching between the normal rotation and the reverse rotation are performed when the travel driver 16 receives signals from the CPU 5 through the second amplifier 11. When the travel driver is switched to the normal speed travel mode, the magnetic tape 1 is made to travel at the first speed. When the travel driver is switched to a high speed travel mode, the magnetic tape 1 is made to travel at the second speed. Further, when the driving motor 12 is controlled to rotate in the normal direction or in the reverse direction, the magnetic tape 1 is made to travel in the normal direction or in the reverse direction.

The magnetic head 4 can be moved in 3 steps being driven by a driving means, not shown in a drawing. The driving means is controlled by the CPU 5, and moves the magnetic head 4 to a playback position in which it is abutted against the magnetic tape 1, to a detection position being in the proximity of the magnetic tape 1, the position in which it is possible to detect a magnetic signal on the magnetic tape 1 which travels at the second speed, and to a cue or review position being further apart from the tape than the detection position, the position in which the magnetic head 4 does not touch the magnetic tape 1 even when the magnetic tape 1 travels in the second speed.

Figure 1:
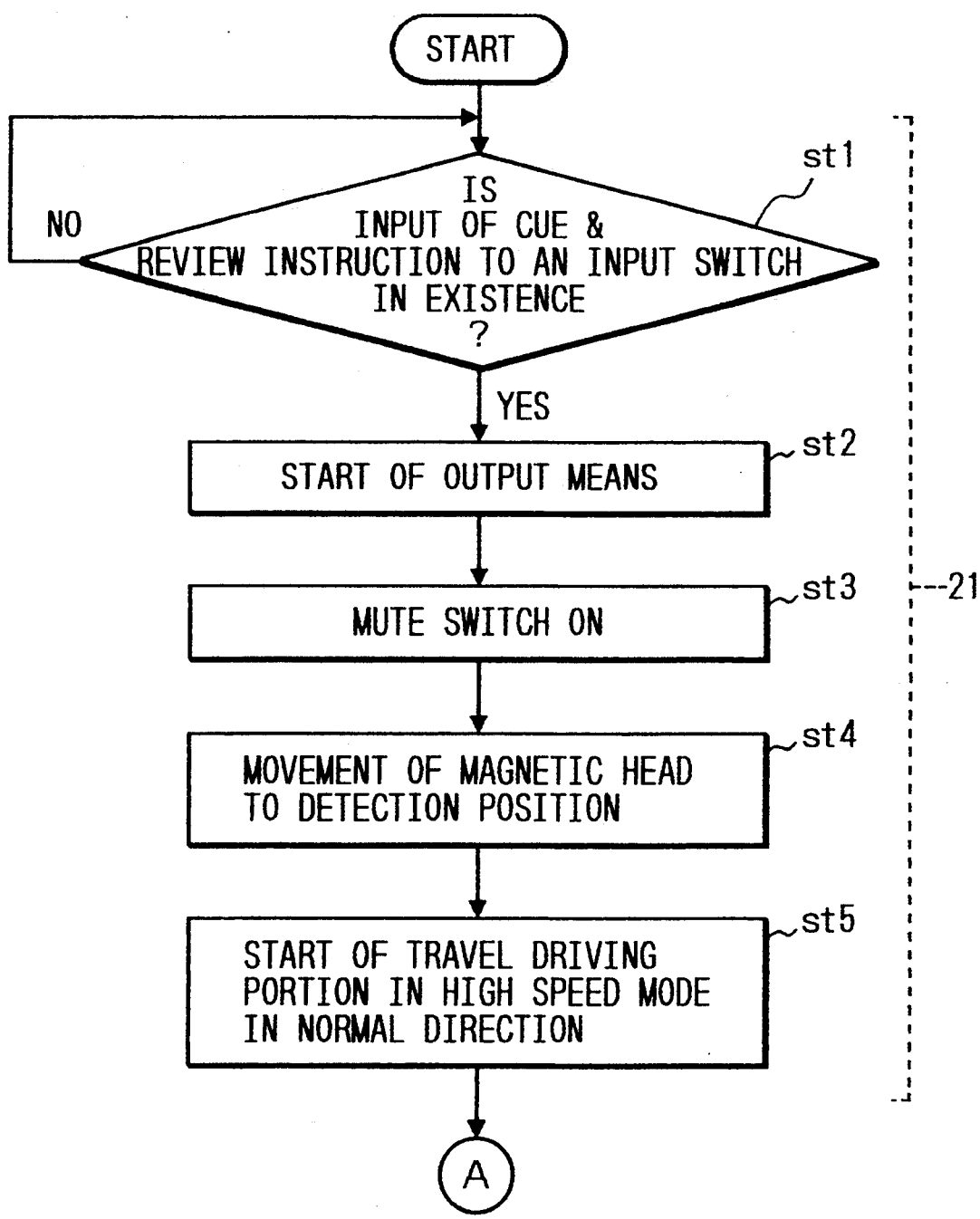
FIG. 1 is a flow chart showing the control of a first controller of a tape recorder in an embodiment according to the present invention.
Figure 2:
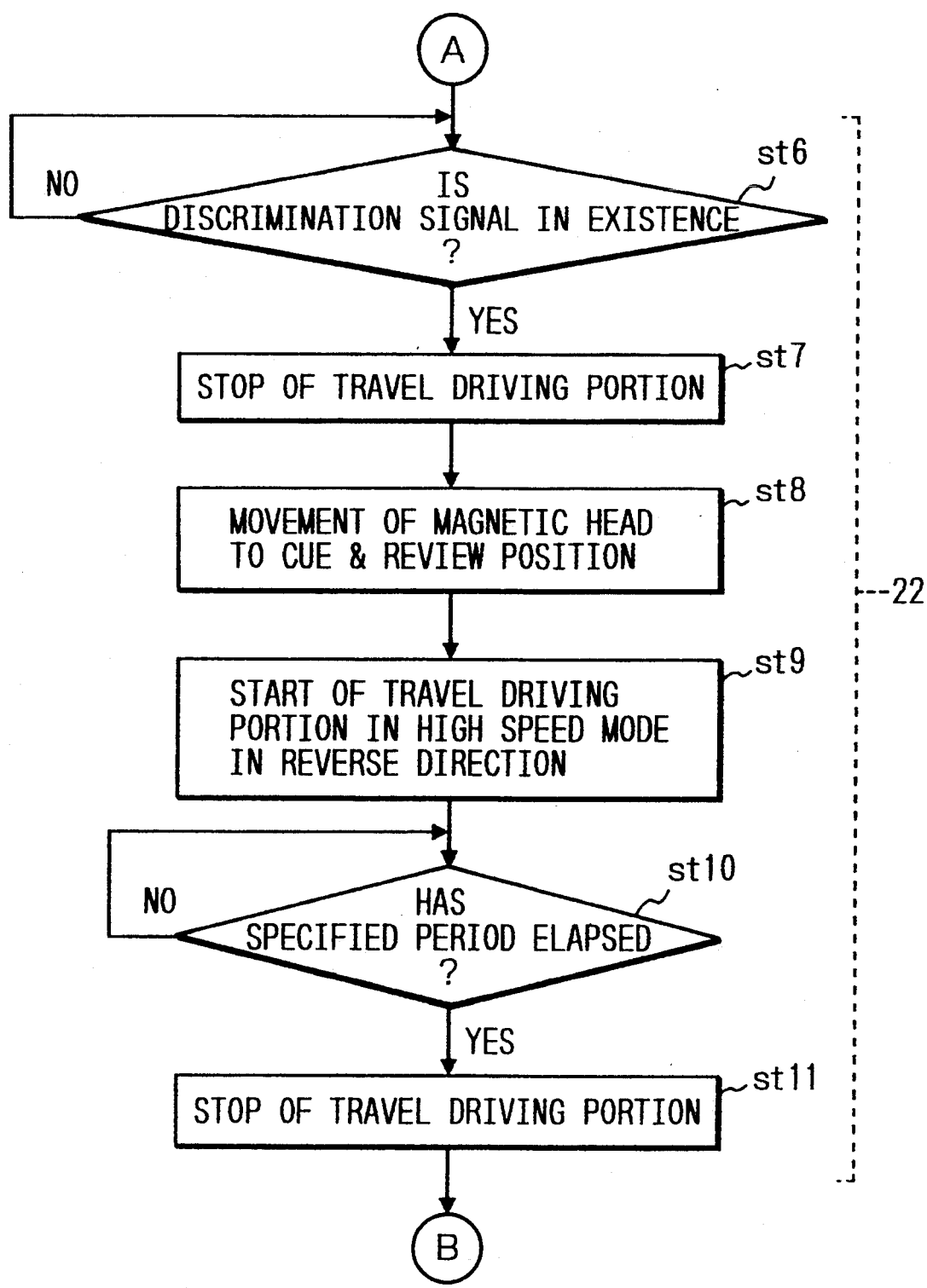
FIG. 2 is a flow chart showing the control of a second controller of a tape recorder in an embodiment according to the present invention.
Figure 3:
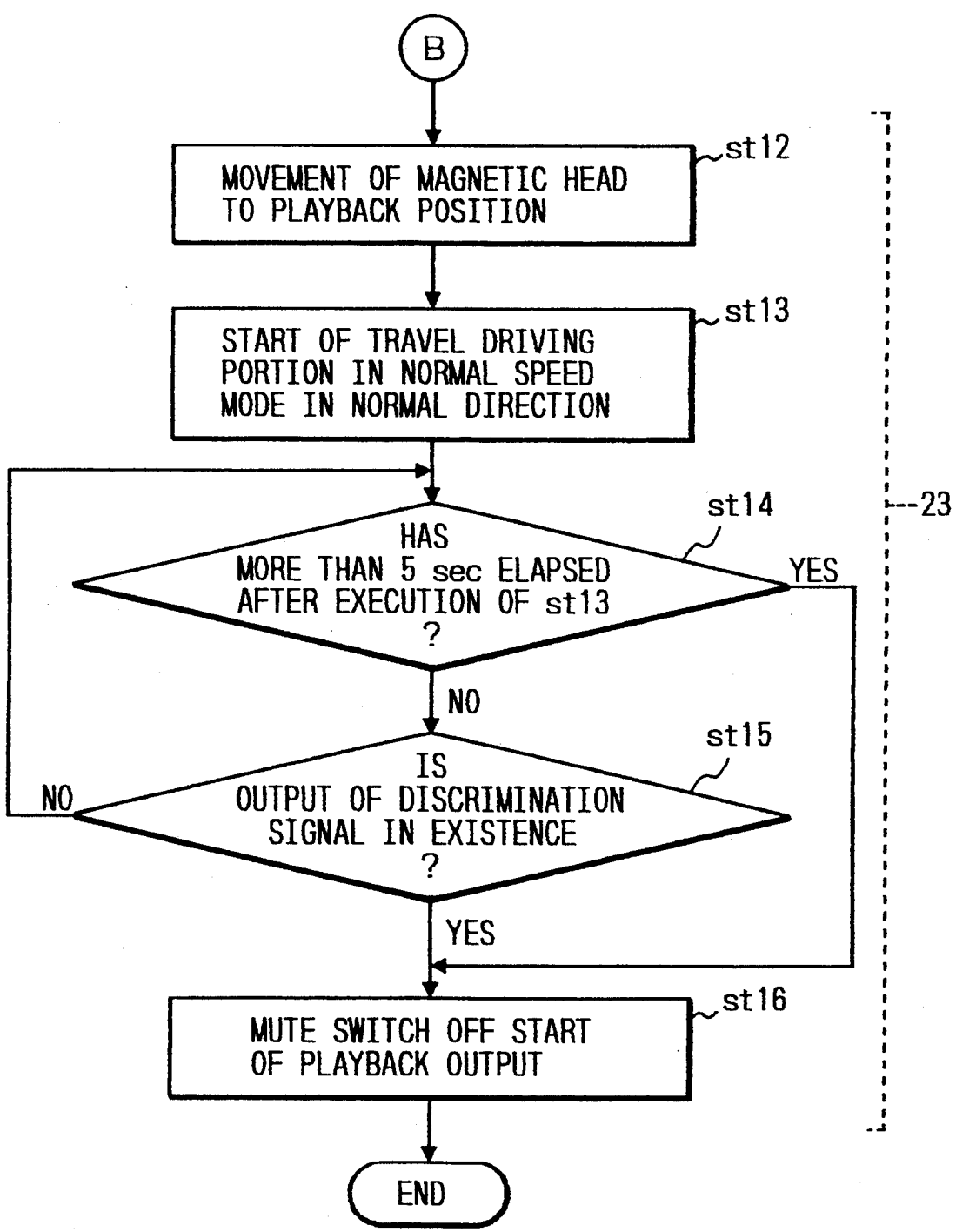
FIG. 3 is a flow chart showing the control of a third controller of a tape recorder in an embodiment according to the present invention.

When a cue & review control is executed, the tape recorder 2, constituted as described in the above, is controlled by the CPU 5 following the flow charts shown in FIG. 1 to FIG. 3. There are provided a first controller 21, a second controller 22 and a third controller 23 in the CPU 5, and they perform cue & review controls in order. The first controller 21, the second controller 22 and the third controller 23 are respectively IC's which constitute part of the CPU 5, and they execute controls as explained in the following.

At first, when a cue & review operation of a magnetic tape 1 is to be performed in the tape recorder 2, a user of the tape recorder 2 inputs a cue & review instruction to the input switch 6. The first controller 21 receives the instruction input in first step st1 and executes second step st2 as shown in FIG. 1. In second step st2 the speaker 8, an output means, is started. The start of the speaker 8 is completed when the first amplifier 7, being controlled by the CPU 5, is ready to amplify the signal from the magnetic head 4 and output the amplified signal from the speaker 8. Next, third step st3 is executed. In third step st3, the muting switch 9 is made ON. The transmission of a signal between the first amplifier 7 and the speaker 8 is cut off by ON-controlling the muting switch 9 and the output from the speaker 8 is suspended.

After the execution of third step st3, fourth step st4 is executed. In fourth step st4, the magnetic head 4 is moved to the detection position. After the finish of fourth step st4, fifth step st5 is executed. In fifth step st5, the travel driver 16 is started in a normal rotation, high speed travel mode. In other words, the magnetic tape 1 is made to travel in 1 direction at a second speed in detecting the signal recorded magnetically on the magnetic tape 1.

After the finish of step st5, the second controller 22 starts to control. In the second controller 22, control is executed as shown in FIG. 2. At first, in sixth step st6, it is judged that whether an output signal of the signal discrimination circuit 10 is in existence or not. When there is an signal of the signal discrimination circuit 10, seventh step st7 is executed. In seventh step st7, the travel driver 16 is stopped. Next, eighth step st8 is executed. In eighth st8, the magnetic head 4 is moved to the cue or review position. When eighth step st8 is finished, ninth step st9 is executed. In ninth step st9, the travel driver 16 is started in a reverse rotation, high speed travel mode. In other words, the magnetic tape 1 is made to travel at the second speed in the reverse direction. Next, tenth step st10 is executed. Tenth step st10 is to make the operation of the travel driver 16 executed in ninth step st9 continue for a second specified period of time set beforehand, and after the lapse of the second specified period of time, eleventh step st11 is executed. In eleventh step st11, the travel driver 16 is stopped.

After the finish of eleventh step st11, the third controller 23 starts to control. In the third controller 23; twelfth step st12 is executed. In twelfth step st12, the magnetic head 4 is moved to the playback position. Next, thirteenth step st13 is executed. In thirteenth step st13, the travel driver 16 is started in a normal rotation, normal speed travel mode. In other words, the magnetic tape 1 is made to travel at the first speed in a forward. Then, fourteenth step st14 is executed. In fourteenth step st14, the driving of the travel driver 16 is made to continue for a third specified period of time set beforehand (for example, about 5 sec.), and after the lapse of the third specified period of time, a playback operation is started compulsorily; when the third specified period of time has not elapsed, fifteenth step st15 is executed and after the lapse of the third specified period of time, sixteenth step st16 is controlled to be executed.

At first, the case where the third specified period of time has not elapsed will be explained. In fifteenth step st15, it is confirmed that the output of a discrimination signal from the signal discrimination circuit 10 is in existence or not. If there is no discrimination signal in fifteenth step st15, fourteenth step st14 is executed again. If there is a discrimination signal in fifteenth step st15, sixteenth step st16 is executed. In other words, if there is an output of a discrimination signal, or if the third specified period of time has elapsed after the finish of thirteenth step st13, sixteenth step st16 is executed. In sixteenth step st16, the muting switch 9 is OFF-controlled and a playback operation is started. In other words, the first amplifier 7 and the speaker 8 are connected to make the signal transmission between them possible by the OFF control of the muting switch 9, and the magnetically recorded signal detected by the magnetic head 4 is amplified and output.

A state where a cue & review operation is operated by the controls shown in FIG. 1 to FIG. 3 will be explained referring to FIG. 5 in the following. There are a first recording portion R1 and a second recording portion R2 with an area of no signal zone in between on the magnetic tape 1 shown in the figure. When the magnetic head 4 is positioned at a place shown with Ts in the first recording portion R1, a cue & review operation of the second recording portion R2 to be performed in the tape recorder 2 will be explained.

When first step st1 to fifth step st5 are executed by the CPU 5, the magnetic head 4 is moved relatively to the magnetic tape 1 toward the second recording portion R2. In this case, since the muting switch 9 is ON-controlled, the output from the speaker 8 is in a state of being suspended. Because of the muting state, a detected signal by the magnetic head 4 for a cue & review operation is prevented from being output from the speaker 8, and the occurrence of noise is prevented. The magnetic tape 1 is driven in a normal rotation, high speed travel mode by the travel driver 16. In other words, the magnetic tape 1 is moved at the second speed from the first recording portion R1 side toward the second recording portion R2 as shown by an arrow AR1 in the figure.

The CPU 5 executes sixth step st6 right after the execution of fifth step st5. In sixth step st6, the retrieval for a no signal zone D1 ranging for the first specified period of time is started. In this case, the distance D1 on the magnetic tape 1 to be covered by the magnetic head 4 traveling at the second travel speed in the first specified period of time is needed for the retrieval of the no signal zone.

When the signal discrimination circuit 10 outputs a discrimination signal in detecting a no signal zone, the CPU 5 receives the signal and executes the steps of from seventh step st7 to eleventh step st11. At first, the travel driver 16 which is in operation in a normal rotation, high speed travel mode is once suspended as described in seventh step st7. In eighth step st8 and ninth step st9, the magnetic head 4 is moved to the cue or review position, and the travel driver 16 is started in the reverse rotation, high speed travel mode. By this operation, the magnetic head 4 is moved relatively to the magnetic tape 1 in a direction as shown with an arrow AR2 at the second speed. Then, in tenth step st10, if it is judged that the second specified period of time has elapsed, the CPU 5 executes eleventh step st11. In the figure, the distance D2 shown with an arrow AR2 is a distance of which the magnetic tape 4 is moved relatively to the magnetic tape 1 in the second specified period of time at the second speed.

When the travel driver 16 is stopped in eleventh step st11, the CPU 5 executes twelfth step st12 and thirteenth step st13. By this operation, the magnetic head 4 is moved to the playback position, and the travel driver 16 is started in a normal rotation, normal speed travel mode. By this operation, the magnetic head 4 is moved relatively to the magnetic tape 1 in a direction as shown with an arrow AR3 at the first speed. In this case, the muting switch 9 which is ON-controlled in third step st3 keeps the ON-control, so that the muting switch 9 prevents the output of an audio signal until it is OFF-controlled in sixteenth step st16 which will be described later.

When the travel driver 16 is started, the CPU executes fourteenth step st14, but in this case, the case where the third specified period of time has not elapsed will be explained. When the third specified period of time has not elapsed, fifteenth step st15 is executed. The CPU 5 judges the existence of a discrimination signal from the signal discrimination circuit 10 in fifteenth step st15. In order that the signal discrimination signal circuit 10 can detect a no signal zone, the first specified period of time is needed, and during the period of time, the magnetic tape 1 which travels at the first speed moves the distance D3 as shown in the figure.

The CPU 5 executes sixteenth step st16 after the magnetic head 4 passes the rear end E1 of the first recording portion R1 and proceeds further by the distance D3. The range in which the sixteen step st16 is executed is the range which is shown in the figure with a broken line portion of an arrow AR3. In the sixteeth step st16, the muting switch 9 is OFF-controlled and a playback operation is started.

According to the control as described in the above, the magnetic tape 1 stops traveling, when a no signal zone having a distance of D1 is detected during the travel in a normal rotation, high speed travel mode as shown with an arrow AR1; the stop position, however, is apt to vary depending on the wound state of the magnetic tape 1, so that the tape is made to travel in the reverse direction by the distance D2, and if there is the first recording portion R1 in the reverse travel by the distance D2, the muting state is maintained, and the output of an audio signal is suspended. When the magnetic head 4 is moved to the no signal zone, the muting state is released and a playback operation is started; thus the output of other signals are stopped and an accurate cue & review operation can be performed.

In other words, when a playback operation is started after finishing a cue & review operation of the second recording portion R2, if the magnetic head 4 is in the first recording portion R1, the muting switch 9 is ON-controlled to suspend the output of an audio signal, and after a no signal zone is detected, the muting switch is OFF-controlled; because of this, an accurate cue & review operation without being influenced by the wound state of the magnetic tape 1 is made possible, which was impossible to enjoy in the past.

Figure 5:
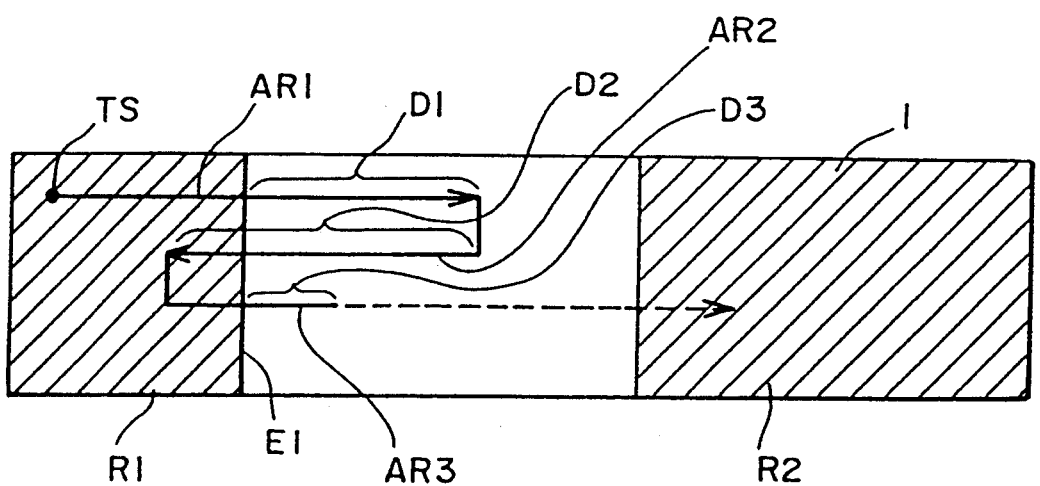
FIG. 5 is an illustrative representation, in showing the relative movement of a magnetic head to a magnetic tape, for illustrating a cue & review operation controlled by the first to the third controllers of a tape recorder in an embodiment according to the present invention.

An object of the present invention can be achieved by the control as shown in FIG. 5; however, in order to secure a more accurate cue & review operation, the CPU 5 executes fourteenth step st14. A case where fourteenth step st14 works, even though it occurs very rarely, will be explained referring to FIG. 6.

The movement condition of the magnetic head 4 for starting a cue & review operation is the same as that shown in FIG. 5. When the magnetic head 4 is moved in a normal rotation, high speed travel mode as shown by an arrow AR1, the stop of the travel driver 16 to be performed in seventh step st7 can be delayed being influenced by the wound state of the magnetic tape 1, and it can be considered that the magnetic head 4 stops at a position OR located in the second recording portion R2, where a subject music of which a cue & review operation is to be performed is recorded. In this case, there is a fear that the magnetic head 4 becomes incapable of returning to a no signal zone or to the inside of the first recording portion 1 being prevented by the movement of the magnetic head 4 toward the arrow AR2 in a reverse rotation, high speed travel mode which is to be executed in the next. In such a case, the magnetic head 4 starts to move as shown by an arrow AR3 in a normal rotation, normal speed travel mode and even if the detection of a no signal zone is waited in fifteenth step st15, a playback operation is started in the second recording portion R2, so that the cue & review operation of the second recording portion is made impossible.

In this case, fourteenth step st14 quickly releases the muting state and makes a playback operation start. In other words, if the CPU 5 executes thirteenth step st13 and the following steps in the state where the magnetic head 4 is in the second recording portion R2, the CPU 5 executes sixteenth step st16 after the lapse of the third specified period of time (for example, 5 sec.) from the execution of thirteen step st13 in fourteenth step st14.

Figure 6:
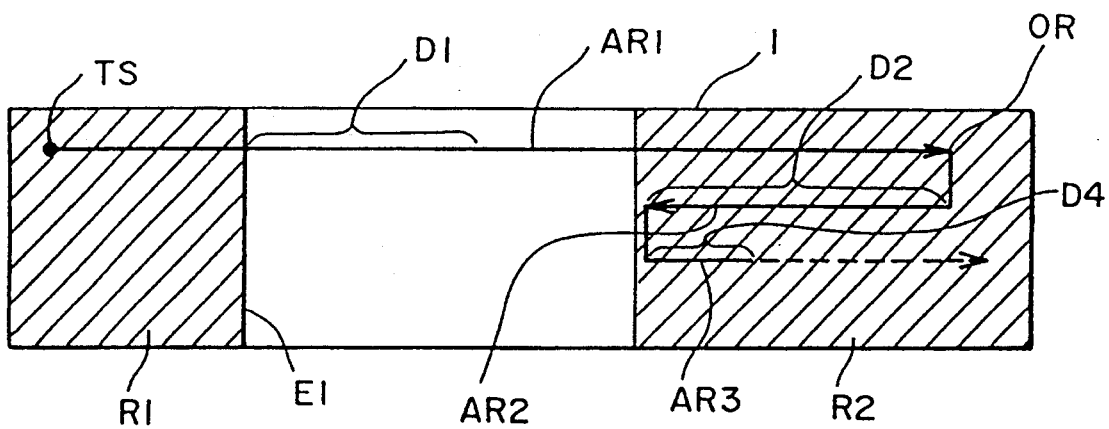
FIG. 6 is an illustrative representation, in showing the relative movement of a magnetic head to a magnetic tape, for illustrating another example of a cue & review operation of a tape recorder in an embodiment according to the present invention.

In other words, after the magnetic tape 1 is made to travel a distance D4, a distance to be covered by the magnetic tape 1 in a normal rotation, normal speed travel mode in the third specified period of time as shown in FIG. 6, the muting switch 9 is OFF-controlled and the output of an audio signal is started as shown with a broken line. Therefore, a trouble for making the OFF control of the muting switch impossible can be avoided.

Figure 7:
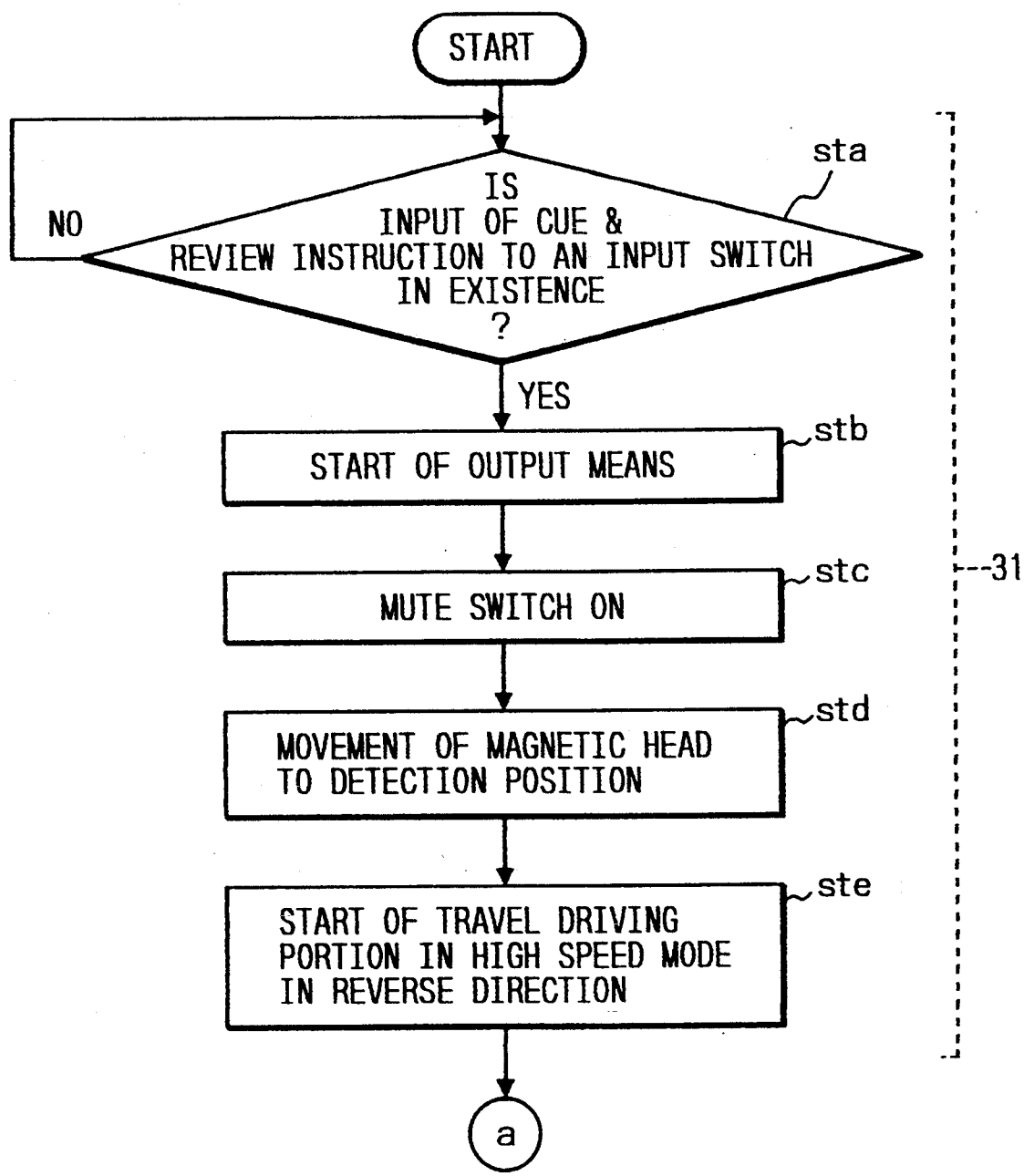
FIG. 7 is a flow chart showing the control of a fourth controller of a tape recorder in an embodiment according to the present invention.
Figure 8:
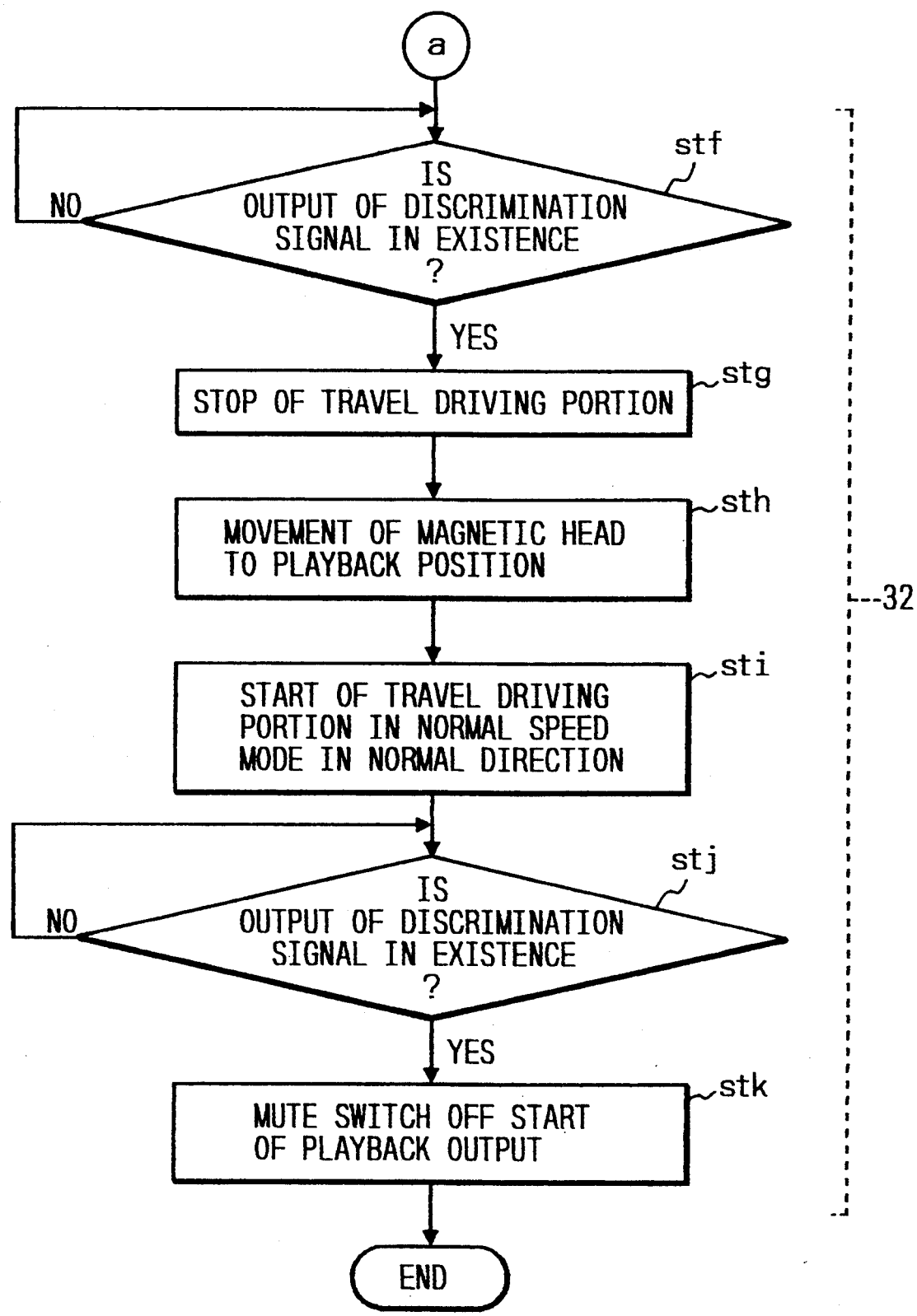
FIG. 8 is a flow chart showing the control of a fifth controller of a tape recorder in an embodiment according to the present invention.

Next, a case where the magnetic head 4 is positioned at Ts in the second recording portion R2 and a cue & review operation of the second recording portion R2 is to be performed from the position Ts will be explained referring to FIG. 7 to FIG. 9

Further, a fourth controller 31 and a fifth controller 32 are added to the CPU 5 of the tape recorder 2. When an instruction input for a cue & review operation of the second recording portion R2 is given to the tape recorder 2 by a user, in first step sta, the instruction input is received and the fourth controller 31 of the CPU 5 executes second step stb.

Figure 9:
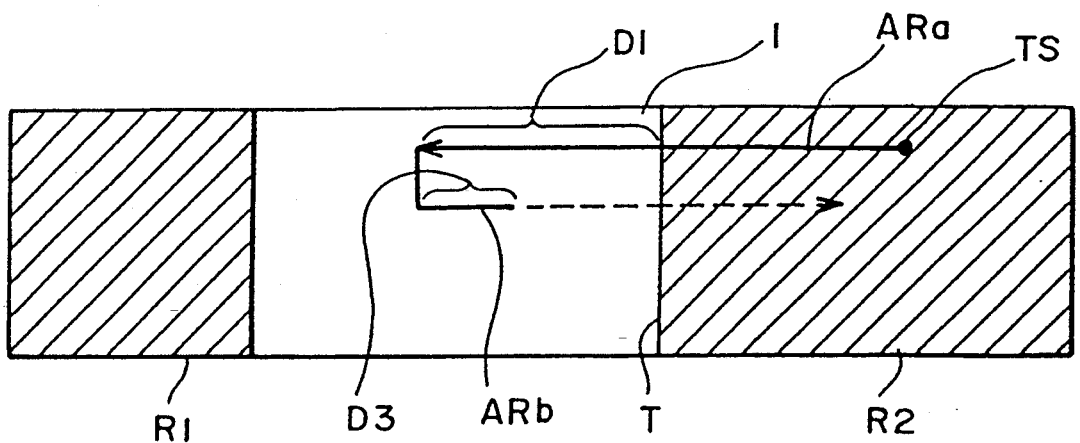
FIG. 9 is an illustrative representation, in showing the relative movement of a magnetic head to a magnetic tape, for illustrating a cue & review operation controlled by the fourth and the fifth controllers of a tape recorder in an embodiment according to the present invention.
Figure 10:
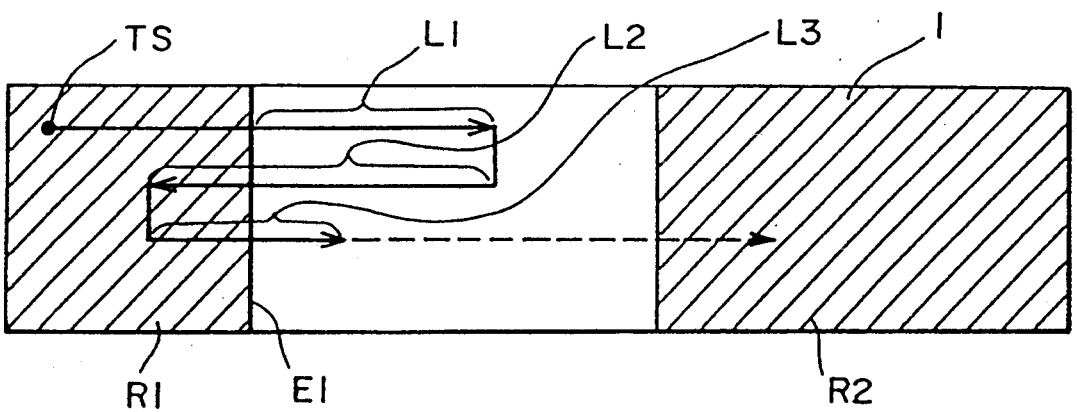
FIG. 10 is an illustrative representation, in showing the relative movement of a magnetic head to a magnetic tape, for illustrating a cue & review operation of a conventional tape recorder.

In order to perform a cue & review operation of the second recording portion R2 from respective head positions, the magnetic head position Ts shown in FIG. 5 and the magnetic head position Ts shown in FIG. 9, 2 switches for inputting a cue & review instruction are provided in the input switch 6 corresponding to the positions of the magnetic head 4. When the control is executed, the fourth controller 31 controls a speaker 8 to be in a state where an audio signal can be output, in second step stb. Further a muting switch 9 is ON-controlled in third step stc.

Next, the magnetic head 4 is moved to the detection position in fourth step std. The travel driver 16 is started in a reverse rotation, high speed travel mode, in fifth step ste. Next, a fifth controller 32 of the CPU 5, after the execution of fifth step ste, executes sixth step stf. In sixth step stf, the existence of a discrimination signal from the signal discrimination circuit 10 is confirmed. If there is no discrimination signal being received, the starting state of the travel driver 16 is maintained, if there is a discrimination signal being received, seventh step stg is executed. In seventh step stg, the fifth controller 32 stops the travel driver 16.

Then, eighth step sth is executed. In the eighth step sth, the fifth controller 32 moves the magnetic head to the playback position, and ninth step sti is executed. In ninth step sti, the travel driver 16 is started in a normal rotation, normal speed travel mode. In tenth step stj, the existence of a discrimination signal is confirmed, and if there is the reception of a discrimination signal, eleventh step stk is executed. In eleventh step stk, the muting switch is OFF-controlled and the play-back output is started.

In performing the control as described in the above, the CPU 5 moves the magnetic head 4 as shown in FIG. 9 relatively to the magnetic tape 1.

When a cue & review operation is started, the magnetic head 4 is positioned at Ts shown in the figure. In other words, the magnetic head 4 is positioned on the way of the second recording portion R2. A cue & review operation of the second recording portion R2 is performed from the position Ts. At first, when the CPU 5 executes from the first step sta to the fifth step ste, the magnetic head 4 starts high speed travel in a reverse direction relatively to the magnetic tape 1. In other words, the magnetic head 4 starts moving toward the first recording portion R1 at the second speed as shown with an arrow ARa in the figure.

Next, the CPU 5 executes the steps of sixth step stf to eleventh step stk. Owing to the above operation, the magnetic head 4 stops traveling when it enters a no signal zone disposed between the first recording portion R1 and the second recording portion R2. For the detection of the no signal zone, a distance D1 shown in the figure is necessary, so that the magnetic head 4 passes the heading part T of the second recording portion R2. The magnetic head 4 suspended at the position starts traveling in a normal rotation, normal speed travel mode as shown with an arrow ARb. During the travel in a normal rotation, normal speed travel mode, a no signal zone is retrieved again, and when the no signal zone spreading over the distance D3 as shown in the figure is detected, a playback operation is started from the position shown with a broken line of the arrow ARb in the figure. When the stop position of a travel in a reverse rotation, high speed travel mode as shown with an arrow ARa is positioned inside the first recording portion R1, the ON-control state of the muting switch 9 is maintained for keeping a muting state, and the outputting of an audio signal of the first recording portion can be prevented.

As described in the above, when a magnetic tape 1 which has been traveling in a high speed travel mode is stopped, the stop position varies depending on the wound state of the magnetic tape 1. If a playback operation is started from a position which is influenced by the wound state of the magnetic tape 1, there is a possibility that a signal in the end part of the first recording portion R1 is regenerated. For the purpose of preventing such noise, the control of the muting switch 9 is performed, and an accurate cue & review operation is made possible, which was impossible in the past.

The present invention is not limited to the above-mentioned embodiments.

For example, the first, the second and the third controllers, 21, 22 and 23 are explained as IC's themselves; however, the similar control can be executed by the software stored in a RAM prepared in the CPU 5.

The speaker 8 is described as an output means; however, the output means is not limited to this, and other acoustic facilities, signal transmission facilities, etc. can be included in the output means.

A recorded signal on the magnetic tape 1 can be an analog signal or a digital signal, and in both cases the above-mentioned control can be realized.

Further even when a mechanism for jumping a music number is added, the above-mentioned cue & review control can be utilized as the final cue & review control.

The muting switch 9 as a muting means as shown in the above-mentioned embodiment is a mechanism to suspend an audio output by breaking a signal transmission circuit, but the muting means is not limited to this. For example, an audio volume controller can be a muting means which substantially controls an audio output close to a suspended state by decreasing the output volume of an audio signal. In other words, a similar effect to that obtained in the above embodiments can be obtained by an audio volume controller provided in place of the muting switch 9, the volume controller which is to be controlled by the CPU 5 similar to the muting switch 9.

As explained in the above, according to the present invention, an accurate cue & review can be constantly realized without being influenced by the wound state of a magnetic tape.

In the case of a conventional tape recorder, in a cue & review operation, the regeneration of other signals has been apt to occur. In the case of a tape recorder, according to the present invention, at first, a rough cue & review operation is performed in making a magnetic tape travel at a high speed and then the tape is made to travel at a normal speed. In this case, a muting state is kept until a no signal zone is detected which is positioned in the immediately preceding position of a signal recording portion of which the cue & review operation is to be operated, so that a playback output of other signal is not output, and the cue & review of the subject signal recording portion can be accurately performed.

What is claimed is:

1. A cue and review mechanism for a tape recorder comprising:
a travel driving means for selectively driving a magnetic tape in a normal speed travel mode or in a high speed travel mode, and being able to switch a travel direction of the magnetic tape from a forward direction to a reverse direction;
a detection means for detecting a plurality of information signals recorded on the magnetic tape, each of the plurality of information signals being preceded by a no signal zone;
an output means for outputting a signal detected by the detection means;
a muting means connected between the detecting means and the output means for preventing a signal output from the detection means from being transmitted to the output means in response to a muting signal;
an input means for transmitting a cue and review command;

a signal discrimination means connected to the detection means for outputting a discrimination signal when a no signal zone is detected by the detecting means;

a control means for controlling the travel driving means and the muting means in response to the cue and review command from the input means and the discrimination signal from the signal discrimination means, the control means including:

a first controller for generating the muting signal and for starting the travel driving means in the forward direction, high speed travel mode, when said control means receives a cue and review command from the input means;

a second controller for switching the travel driving means to the reverse direction, high speed travel mode for a specified period of time, when the discrimination signal is received from the signal discrimination means after the travel driving means is started by the first control means; and a third controller for switching the travel driving means to the forward direction, normal speed travel mode, and for canceling the muting signal in response to the discrimination signal from the signal discrimination means, after the finishing of the control by the second controller.

2. A tape recorder according to claim 1, wherein a muting switch is used as said muting means.

3. A tape recorder according to claim 1, wherein a volume controller is used as said muting means.

* * * * *